United States Patent [19]

Dolby

[11] Patent Number: 4,773,094

[45] Date of Patent: Sep. 20, 1988

[54] APPARATUS AND METHOD FOR CALIBRATING RECORDING AND TRANSMISSION SYSTEMS

[76] Inventor: Ray M. Dolby, 3340 Jackson St., San Francisco, Calif. 94118

[21] Appl. No.: 835,244

[22] Filed: Mar. 3, 1986

Related U.S. Application Data

[63] Continuation-in-part of Ser. No. 812,550, Dec. 23, 1985, abandoned.

[51] Int. Cl.$^4$ ............................................ H04R 29/00
[52] U.S. Cl. ......................................... 381/58; 381/98
[58] Field of Search .................. 381/58, 57, 106, 103, 381/98; 369/53, 54, 58; 324/57 N, 77 G, 113; 333/14

[56] References Cited

U.S. PATENT DOCUMENTS

| | | | |
|---|---|---|---|
| 2,364,723 | 12/1944 | Kellogg | 369/70 X |
| 3,639,703 | 2/1972 | Bergemann | 324/52 X |
| 3,760,102 | 9/1973 | Robinson | 381/58 |
| 3,826,871 | 7/1974 | Kraemer | 381/58 |
| 4,118,601 | 10/1978 | Yeap | 381/58 |
| 4,306,113 | 12/1981 | Morton | 381/58 |
| 4,524,444 | 6/1985 | Efron | 369/53 |

FOREIGN PATENT DOCUMENTS

| | | |
|---|---|---|
| 0087907 | 9/1983 | European Pat. Off. . |
| 0116135 | 8/1984 | European Pat. Off. . |
| 3121644 | 5/1981 | Fed. Rep. of Germany ........ 381/58 |
| 3334259 | 4/1985 | Fed. Rep. of Germany . |
| 55-17837 | 2/1980 | Japan . |
| 59-104709 | 10/1984 | Japan . |
| 1120346 | 7/1968 | United Kingdom . |

OTHER PUBLICATIONS

R. F. Allison, "The Sound Field in Home . . . ", *Journal of the A. E. S.*, vol. 24, No. 1, Jan. 1976, pp. 14–19.

*Audio Cyclopedia*, 1979, H. Sams & Co., paragraph 22.139, pp. 1410–1411.

General Radio, "Type 1396-B Tone-Burst Generator", Instruction Manual, Jul., 1968.

*Primary Examiner*—Forester W. Isen
*Attorney, Agent, or Firm*—Majestic, Gallagher, Parsons & Siebert

[57] ABSTRACT

An audibly distinctive test signal, a pink noise signal at a standard level and periodic but brief interruptions (optimized for the ear's memory for level and spectral differences), is applied to a recording medium or transmission channel. The test signal recovered from the recording medium or transmission channel is compared and matched to a reference uninterrupted pink noise signal at a standard level, the interruptions being used to switch between the test and reference signals and to provide an audible cue as to the identity of the signal heard at any moment so that a rapid confirmation and adjustment, if necessary, of recording/reproduction or transmission/reception calibration can be achieved primarily by ear and, if desired, also by applying the signals to measuring instruments.

50 Claims, 7 Drawing Sheets

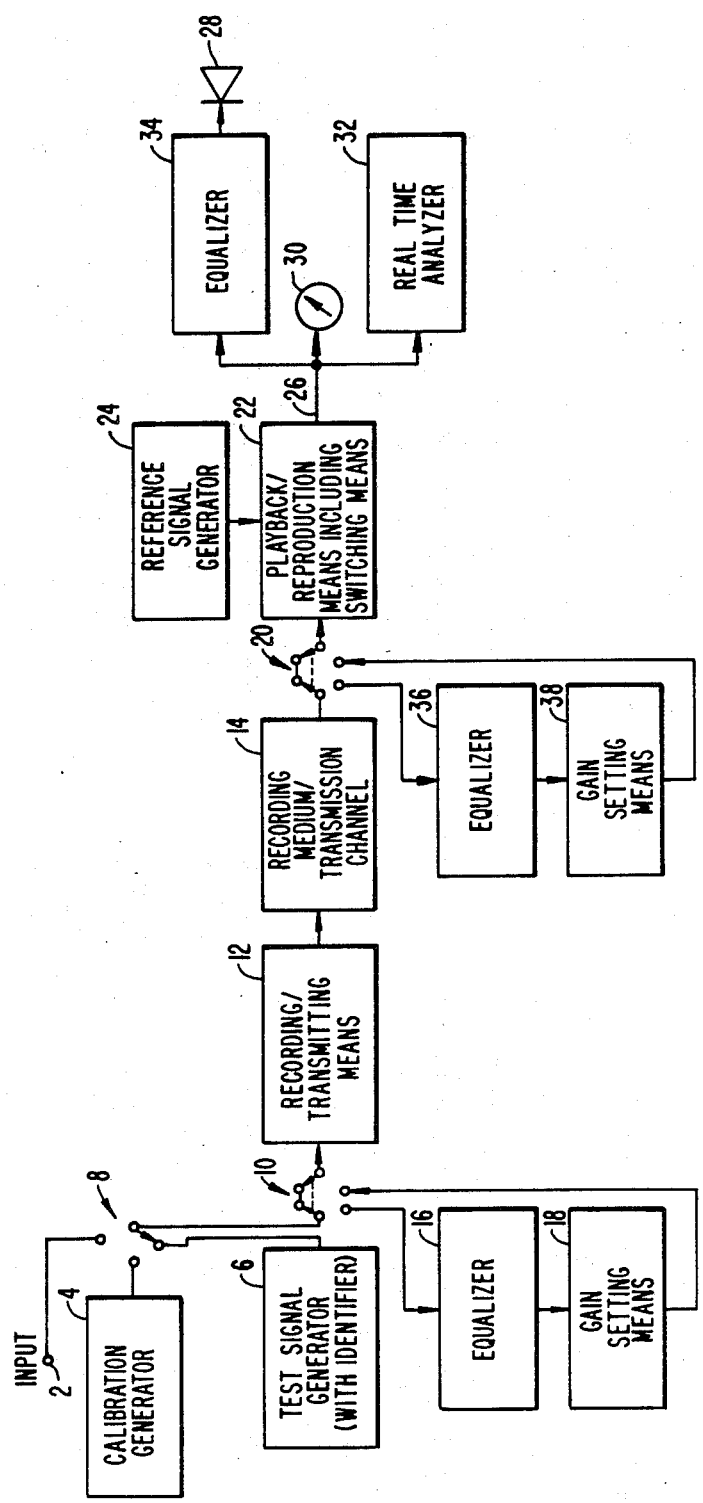
FIG._1.

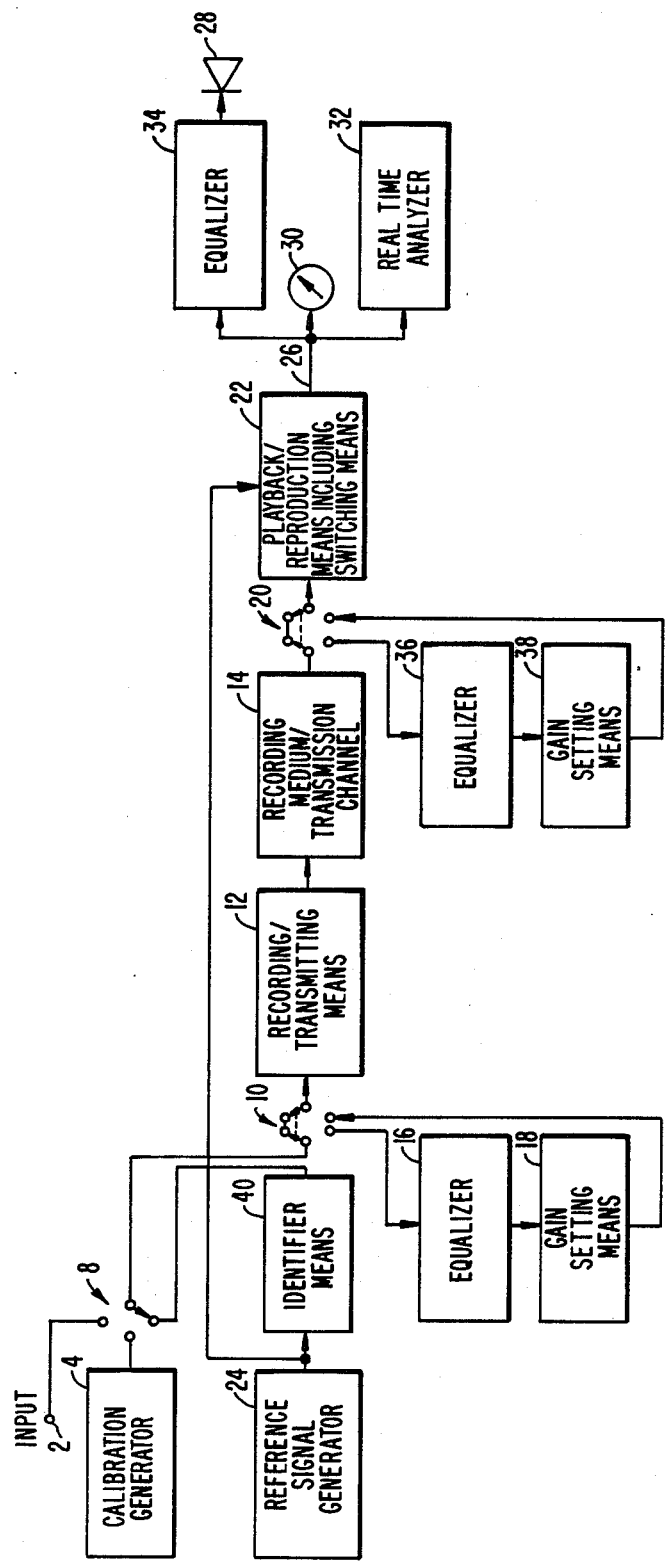
FIG._2.

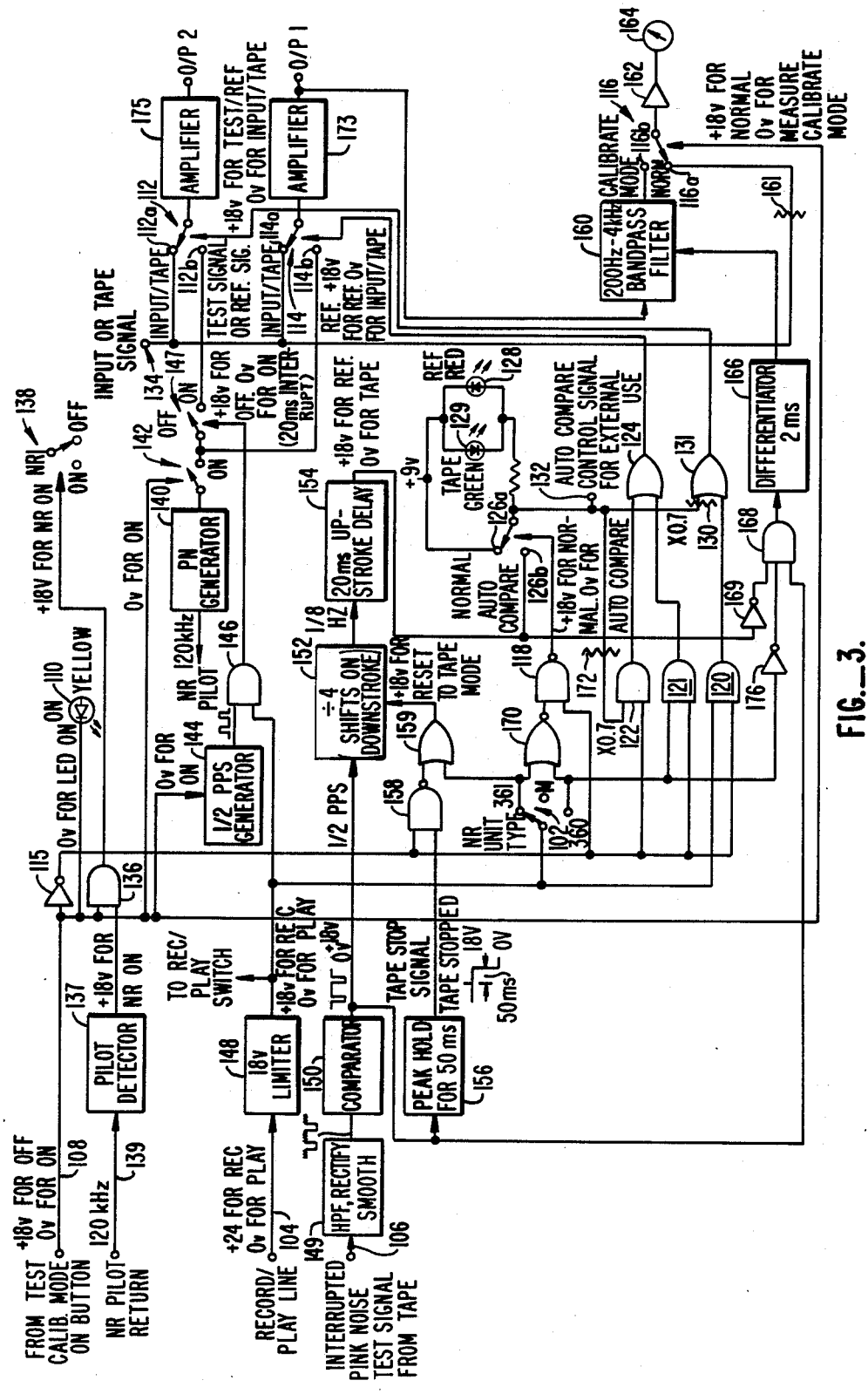
FIG._3.

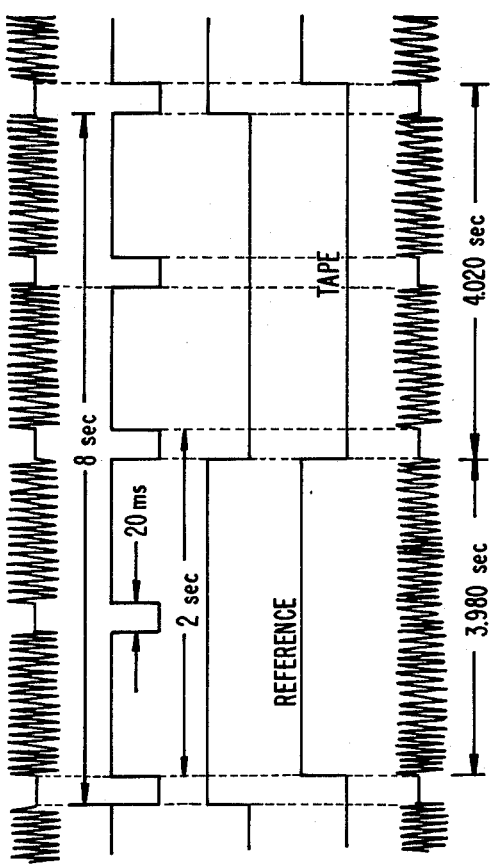
FIG._4A. OFF TAPE TEST SIGNAL:
FIG._4B. COMPARATOR 150 SIGNAL:
FIG._4C. SIGNAL FROM DIVIDER 152:
FIG._4D. AFTER 20 ms UPSTROKE DELAY 154 }:
FIG._4E. AUTOMATIC COMPARISON OUTPUT:
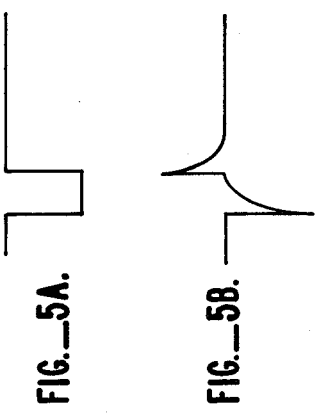
FIG._5A.
FIG._5B.

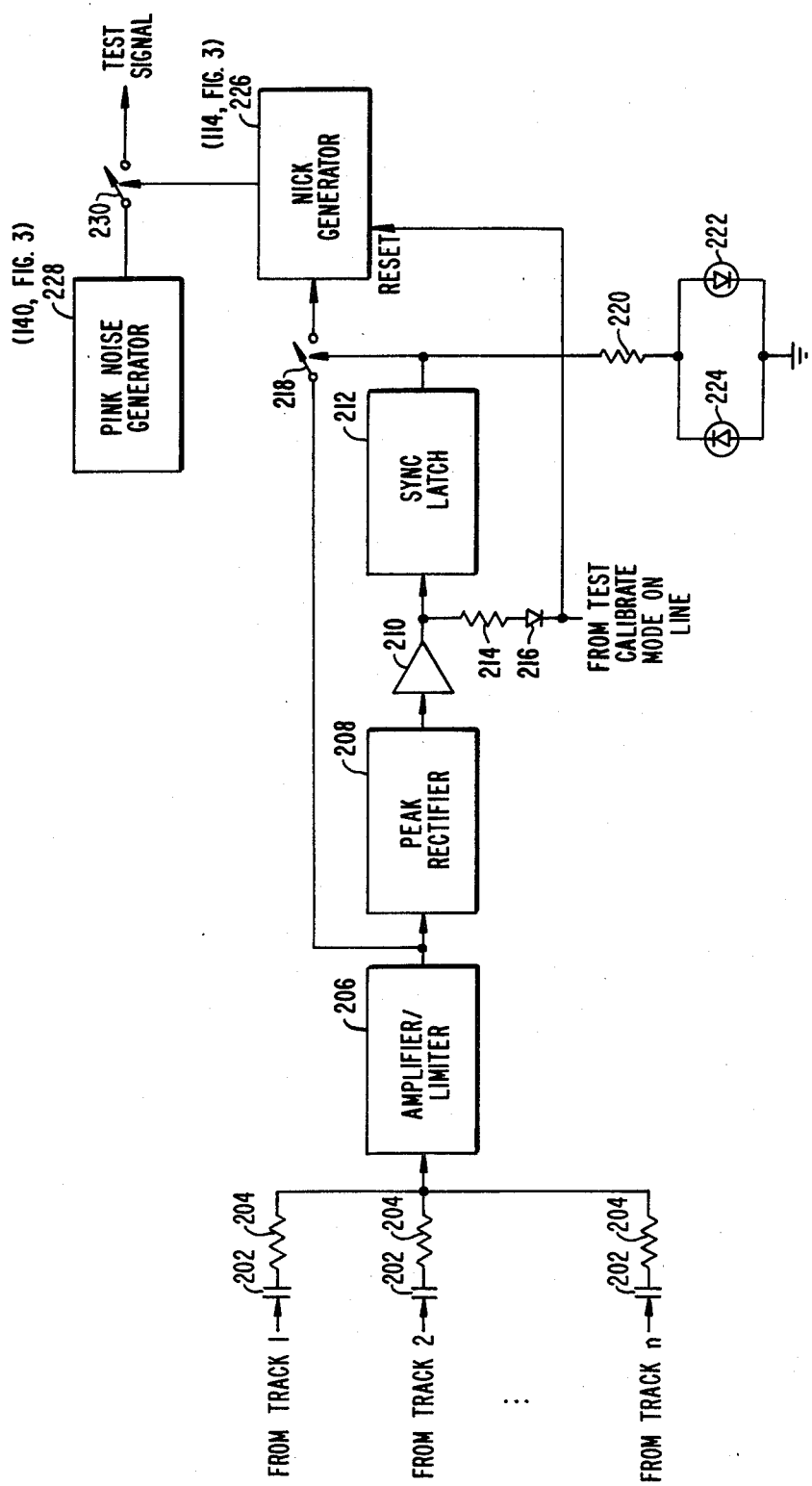
FIG.—6.

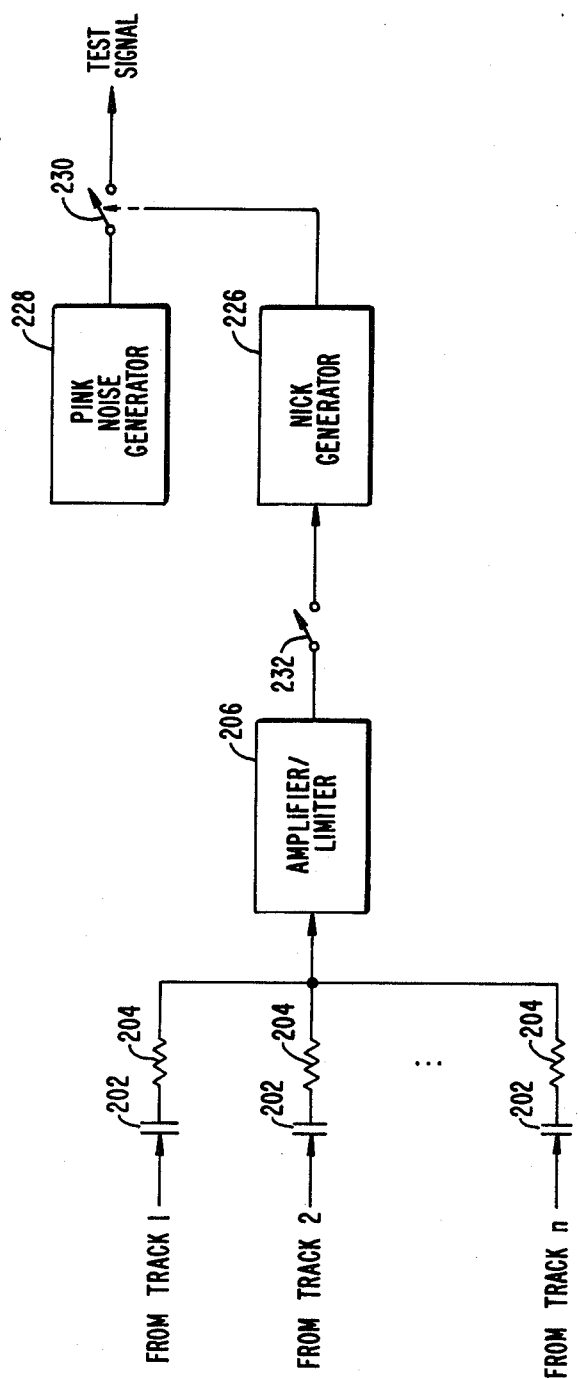
FIG._7.

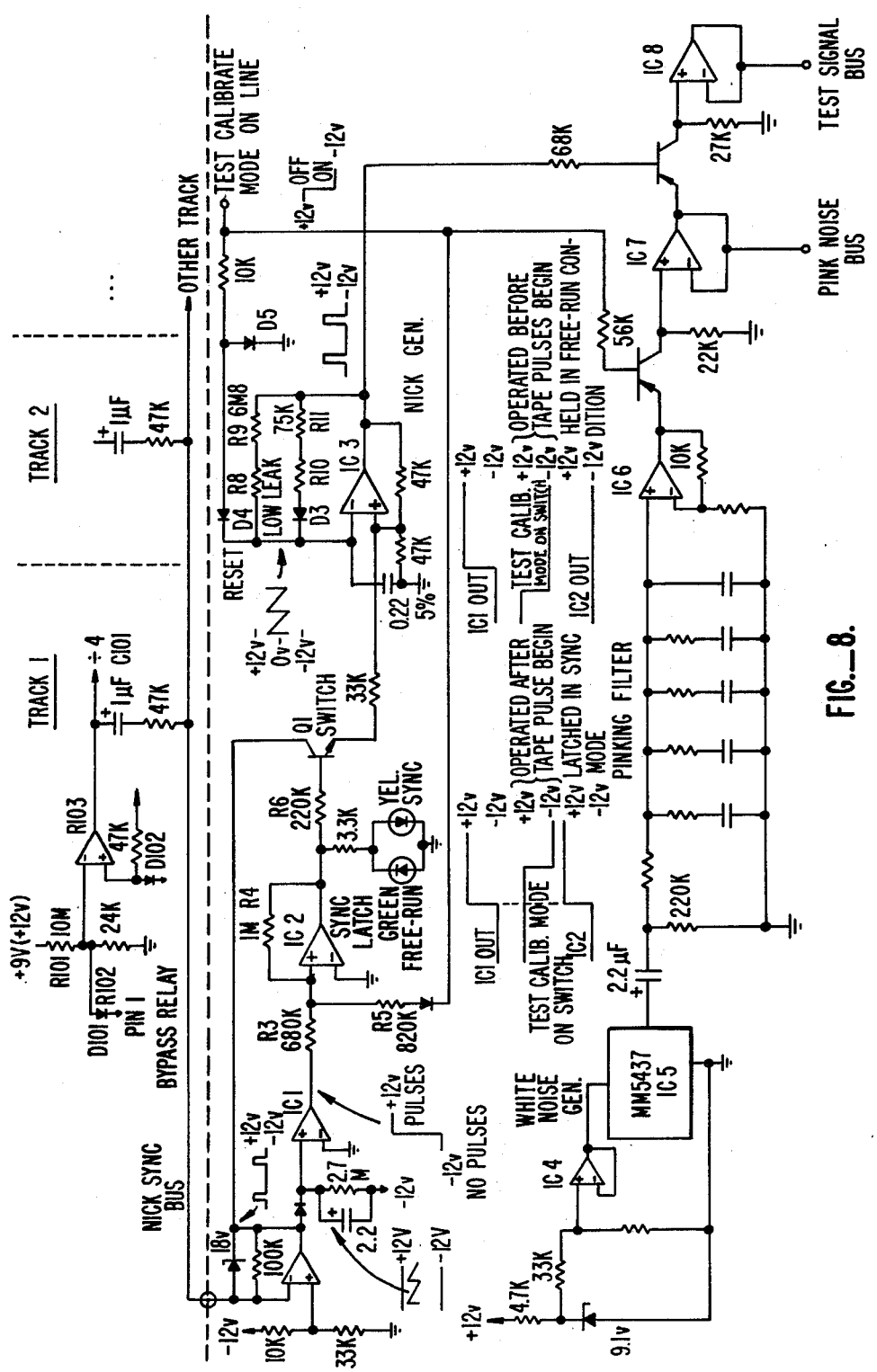
FIG._8.

APPARATUS AND METHOD FOR CALIBRATING RECORDING AND TRANSMISSION SYSTEMS

CROSS-REFERENCE TO RELATED APPLICATION

This application is a continuation-in-part of my copending application of the same title, Ser. No. 06/812,550, filed Dec. 23, 1985, now abandoned.

BACKGROUND OF THE INVENTION

The present invention relates to the calibration of level (gain) and frequency response in recording and transmission systems, particular at audio frequencies. More particularly, the invention relates to apparatus and methods for accurately and quickly accomplishing such calibration or the confirmation of prior calibration by comparison, particularly auditory, of a reference signal with a test signal played back or reproduced from the recording or transmission system.

The invention provides an arrangement for ensuring that the played back signal from a storage medium, such as magnetic tape or an optical (photographic, cinematographic) sound track, or from a transmission channel, such as a radio-frequency, telephone, or fiber optic link, matches in level and frequency response the signal applied to the storage medium or to the transmission channel.

For convenience, the invention will be described in connection with a magnetic tape recorder. In the preferred embodiment, the invention is associated with noise reduction companding circuitry, although the invention may or may not operate at the same time the noise reduction circuitry is active. The invention is not limited to use in magnetic tape recorders nor need it be associated with noise reduction systems.

It is known to provide various types of test signals for the purpose of calibrating and aligning recording systems, transmission systems and channels, sound playback systems, and the like. For example, well known procedures for aligning magnetic tape recorders typically include the following or similar steps:

(1) Align the recorder playback gain and frequency response by use of a standard reference tape on which a series of sine waves at known levels and discrete frequencies throughout the audio range are recorded;

(2) Using an oscillator and blank tape, and measuring signals at the output of the playback process, set the recording bias for a desired characteristic of recording distortion and/or noise and/or high frequency compression;

(3) Adjust the recording gain while measuring the playback output, using a sine wave at a mid-frequency (e.g., 1 kHz); and (4) Align the frequency response of the recording process at the frequency extremes by applying test signals (discrete tones throughout the spectrum and/or sweep tones and/or pink noise), recording and playing back such test signals and modifying the recording equalization characteristics as may be necessary.

In the past ten years pink noise has been introduced by Dolby Laboratories as a test signal to align the optical sound heads and preamplifiers of motion picture projectors. The signal is applied to a real time analyzer (spectrum analyzer) to provide a quicker indication of the system level and frequency response than would be possible using a multiplicity of spot frequency tones. In recording studios, on the other hand, such alignment procedures continue to be performed using discrete frequencies even though they need to be performed on a frequent and regular basis, usually daily and/or when a new batch of tape is put into use. However, because the procedures are time consuming and boring, proper calibration is often not done and in any event is not subject to a rapid confirmation by the users of the equipment (during recording sessions, for example). Moreover, few recording studios own the real time analyzers which are necessary for pink noise alignment techniques and few studio technicians and recording engineers are familiar with pink noise techniques.

The present invention provides an inexpensive, quick, and easy to use pink noise calibration system that will be used frequently and thereby ensure an overall higher quality of the recording (transmission) and playback (reproduction) process.

Such an improvement in recording/transmission technology is useful in its own right but is also particularly valuable when compression/expansion noise reduction systems are used. In such systems, the levels in the noise reduction decoder (expander) should be as close as possible to those in the noise reduction encoder (compressor). One prior art arrangement, described in U.S. Pat. No. 3,760,102, applies a fixed frequency tone having a standard level to tapes for that purpose. The tone is frequency modulated so as to uniquely identify the tone without affecting its standard level.

SUMMARY OF THE INVENTION

In accordance with the principles of the present invention, a test signal having an audibly identifiable characteristic (an identifier) is applied at a standard level to the input of a recording or transmission system. The reproduced test signal from the system output is then matched to the reference signal at the standard level by adjusting the level and spectral balance at one or more places in the system. The invention is intended principally for use in audio systems, although aspects of the invention may be applicable to other frequency ranges.

The test signal comprises a wide frequency range signal including frequency components throughout the spectrum under test. It contains, on a simultaneous basis, all of the frequencies of concern. This may be signals at a multiplicity of discrete frequencies or a wideband noise signal, preferably a pink noise signal. Pink noise rather than white noise is preferred as a basis for the test signal because the noise energy per octave is distributed equally, thus providing a smooth full spectrum sound.

Certain multiple discrete frequency test signals may also be usable instead of a wideband noise signal. For example, the test signal may have tones at discrete frequencies spaced at one-third octave intervals corresponding to the bandpass channel center frequencies of real time analyzers. Wider frequency spacings, at half octaves and two-thirds octaves may also be usable, particularly for non-professional applications. A multiple discrete frequency test signal with frequency spacings chosen so as not to cause low frequency beat frequencies is advantageous in comparison to a wideband noise signal in that such a test signal results in steady readings by measurement equipment, whereas unprocessed wideband noise causes unsteady readings. In a practical arrangement the frequencies chosen might be at the standard I.S.O. one-third octave frequencies of, for example, 100 Hz, 125 Hz, 160 Hz, 200 Hz, etc.; on the musical scale these frequencies are about a third of a tone flat with respect to the notes G, B, and D sharp in each octave. The third octave sequence yields a triad chord in each octave, comprising a third and an augmented fifth. The resulting sound of the test signal is not unpleasant but it is rather busy and intense sounding; for this reason pink noise may be preferable if listening comparisons, not meter readings are primarily done. A further advantage of pink noise is that it does not create standing waves in a reverberant environment, whereas continuous discrete frequency waves would create standing waves with consequent emphasis or de-emphasis of various frequencies at different locations in the room. Also, from a cost standpoint at the present time it is much less expensive to generate an accurate wideband noise signal than to generate a test signal having a large number of discrete frequency tones.

The test signal according to the present invention also contains an identifier so that the test signal is unique and can be distinguished from other test signals. The identifier may also have a secondary identification purpose such as to indicate that the recording or transmission has been encoded with a particular type of noise reduction characteristic. A preferred identifier is repetitive interruptions of the test signal for brief periods. Silent interruptions or gaps ("nicks") in the test signal are preferred rather than other identifiers (for example, brief or continuous low level tones along with the test signal or during interruptions in the test signal) because other identifiers may be psychoacoustically annoying and are likely to interfere with correct measurements by equipment such as real time analyzers. Another alternative is to generate a test signal having an identifier only for a brief period, say one second, at the beginning and end of the test signal recording or transmission period. One disadvantage of such an arrangement is that if the test signal is in itself not unique, then the user does not have a continual identification of the test signal and may have to wait until the test signal period ends to confirm that the test signal and not some other signal is being received.

In accordance with the present invention, the preferred test signal and identifier is interrupted pink noise, which is subjectively pleasing to the ear, has an audible cue so that a listener can quickly identify the reproduced test signal as coming from the system under test, and provides other advantages mentioned below. The length of the interruptions is selected so that the interruptions are long enough to be heard even in a reverberant room yet short enough to avoid disrupting the ear's ability to determine the level and spectral content of the sound. Measurements by real time analyzers are essentially unaffected by the interruptions because such devices have peak hold circuits with long enough time constants in relation to the interruption period used. Interrupted multiple frequency test signals with tone spacings of one-third, one-half, and two-thirds octaves are also subjectively pleasing to the ear.

The identifier, in addition to identifying the test signal, preferably is also used to trigger a switching arrangement that automatically alternates the reproduced test signal with a local reference signal, at the standard level, so that the test signal can be compared with the reference signal. Although such switching may be done manually, it is preferred that the switching occurs automatically for convenience and to enhance the accuracy of the comparisons by standardizing the optimum period lengths. The local reference signal is the same basic signal as the test signal; however, the local reference signal has no identifier. Thus, the listener can easily distinguish the received test signal from the local reference signal. By using interruptions, gaps, or nicks (or some other repetitive marker) as the identifier, a switching signal can be easily derived in response to each gap or in response to every second (or third, etc.) gap. Switching signals could also be derived from test signals with non-repetitive identifiers by using more complex circuitry.

In principle, the test signal applied to the system under test need not carry an identifier, in which case apparatus at the reception or reproduction point can add an identifier to either the received test signal or the local reference signal so that the listener can distinguish them. However, it is preferred that the test signal carry an identifier so that the test signal is not confused with other signals carried by the recording medium or transmission channel and also because the circuitry at the reception or reproduction can be as simple as possible. Furthermore, as mentioned above, a repetitive identifier in the received test signal is useful in triggering the switching function. Although the local reference signal, in principle, can also have an identifier, different from that of the test signal, the use of an identifier on the reference signal is not preferred because it would complicate the circuitry required without providing any significant improvement in operation.

When used in connection with audio systems, the alternating reproduced test signal and reference signal are intended principally to be audibly compared. However, the alternating signals may also be applied to a meter for measurement of relative amplitude levels or to a real time analyzer for more rigorous analysis of amplitude response throughout the frequency spectrum. Although comparisons using measuring equipment can be substituted for an audible comparison, one of the major features of the invention is the ease and accuracy with which it permits an audible comparison to be made.

The repetition spacing of the interruptions in the test signal and the switching time between the test and reference signals is selected so as to provide sufficient time for the ear to identify which signal is being heard and to note differences in levels through the audio spectrum. However, the period must not be so great that the ear's memory for levels and spectral content begins to fade (e.g., after a few seconds). The invention thus provides a rapid confirmation that the system is properly aligned. In practice, on a direct A/B comparison basis, the human ear is capable of recognizing surprisingly small differences in pink noise frequency response, in the order of only one-half a decibel in any particular part of the spectrum. The use of an equalizer in the listening channel may be a useful aid in making easier level comparisons in particular frequency ranges.

For identification, in the preferred embodiment, the pink noise is interrupted briefly on a periodic basis, for example for 20 milliseconds (ms) every 2 seconds, providing an audibly distinctive, subjectively pleasing, test signal conforming to the ear's time constant and memory mechanisms. This signal is fed to the recording or transmitting apparatus which in turn applies it to the the storage medium or transmission channel.

In addition to having a known spectral response, the test signal and reference signal are designed to have the same known level, a standard level. A suitable standard level is about 20 dB below the nominal maximum level of the recording or transmission system (the pink noise being measured through an audio bandpass filter). This reduced level is low enough not to cause saturation problems with low speed tape recording, highly equalized transmission channels (such as FM broadcasting), or optical film recording, for example. Furthermore, the audible level is not so high as to be annoying when using the standard recording levels and monitor gains employed during a recording session. The reference signal is provided at the same level in order that both a level and frequency response comparison between the reference signal and the reproduced test signal can be made.

When played back from the storage medium or reproduced from the transmission channel, the gaps, nicks, or interruptions in the recovered test signal are used to automatically alternate the recovered test signal with an uninterrupted reference signal generated locally at the playback or reproduction apparatus. An audible comparison can thus be made between the uninterrupted pink noise reference signal and the pink noise test signal being played back or reproduced. This test calibration mode of operation is called "Auto Compare". Any discrepancies in level and/or spectral balance are immediately noticeable to the ear and can be corrected or at least taken note of by the operator. If desired, the alternating test and reference signals can also be fed to a real time analyzer. In practice, the invention permits a very quick and easy confirmation by users, during a recording session, for example, that the recording system is properly calibrated.

In order to be able to make full use of the invention as a new calibration method it is important to be able to tell when the reproduced test signal segments are selected as the output signal to the monitor or real time analyzer and when the reference signal is selected. The test signal segments and the reference signal segments are distinguished in two ways. First, the reference segments are continuous pink noise, preferably about four seconds, and the tape segments are also about four seconds long, beginning with an interruption, having at least one interruption in the middle, preferably only one interruption, and ending with an interruption; this 8 second time sequence is easily recognized and understood by the listener with a little practice. While other timing sequences may be usable, these timings have been found to be near optimal for the ear's memory for level and spectral differences. Second, additional means are provided to identify which signal is selected, for example, visual distinguishing means such as display lights can identify the signals: a first color light (e.g., green) marking the tape signal, a second color light (e.g., red) the reference signal. Also, a signal for actuating remotely mounted distinguishing means, such as colored lights near the monitor loudspeakers, can be provided.

To prevent whole tapes from being recorded inadvertently with nothing but the interrupted pink noise test signal, a further visual display (e.g., yellow light) is employed to show that the system is operating in the test signal calibration mode. This can be augmented by a further reminder such as another colored light near the monitor loudspeakers.

During the test signal calibration mode the alternating test/reference pink noise signals fed to the monitor are also fed to a meter circuit (if the calibration system is used in conjunction with a noise reduction compander, the noise reduction meter circuit can be used) after band limiting to allow a passband of about 200 Hz to about 4 kHz, for example. Band limiting reduces the effect on the meter reading of frequency response errors in the tape recorder and also improves the stability of the reading (less bouncing). The main monitor output to loudspeakers and/or a real time analyzer is not band limited.

In practical operation, the present invention can be used in at least several different ways. In a first case, assume that the transmission channel or recording medium is calibrated or that it is unavailable for adjustment and calibration, but that both the recording/transmitter end of the system and the playback/reproduction end of the system are accessible. In that case, the received test signal can be matched to the reference signal by whatever means available at the two ends of the system—what is essential is that there be as close a match as possible at the output of the system: spectral imbalances within particular portions of the system, the recording/transmitting apparatus or the medium/channel or the playback/reproduction apparatus, are unimportant so long as there is a match at the system output. Thus the standard level test signal is applied to the system input and as reproduced at the system output it is compared to the reference signal. In order to match the test signal from the system output to the reference signal, the level and spectral balance at the two ends of the system are adjusted as necessary, using, for example, equalizers that permit attenuation or boosting of levels in particular frequency ranges throughout the frequency band of concern. For example, one equalizer could be used at the input of the recording/transmitting apparatus and another equalizer at the output of the playback/reproduction apparatus. Any other system adjustments affecting level and spectral balance may also be used, such as adjustment of head azimuth in a tape recorder.

In a second case, the present invention can be used to standardize the recording/transmitter end of the system and the medium/channel in level and frequency response. In this case, the playback or reproduction side of the system is first calibrated as may be necessary. Then, as in the case above, the test signal is applied to the system input and as reproduced at the system output is compared to the reference signal. In order to achieve a match, adjustments are made to the recording/transmitter apparatus (as by using an equalizer in its input) and to the recording medium or transmission channel. This is the situation in which a self contained tape recorder is properly calibrated, or transmissions are made to remote receiving locations, or when pre-recorded tapes are produced.

In a third case, only the playback or reproduction side of the system is available for adjustment. This common situation occurs when a pre-recorded tape is played or a remote transmission is received. While it is assumed that the test signal is of the correct level and spectral content when applied to the system input, it is not known what has happened to the test signal prior to its playback or reproduction. Thus, the test signal from the system output is compared to the local reference signal and the level and spectral balance is adjusted as may be necessary to obtain the closest possible match. The production of pre-recorded tapes having the test signal recorded thereon in addition to their main musical or informational material would be particularly useful for aligning playback systems. The test signal on pre-recorded tapes could also be employed to identify that the tape is encoded using a particular type of noise reduction characteristic.

When the test signal calibration system of the present invention is used in magnetic tape recording systems, it preferred to have an arrangement in which simultaneous record and playback is possible. Such arrangements require separate record and playback heads along with such accompanying circuitry as to permit the recording of the test signal while simultaneously playing back through a monitor circuit the just recorded test signal reproduced from the playback head (the playback head is typically a short distance "downstream" of the record head so that information recorded is played back after a very short time delay).

The audible Auto Compare function is not available on a simultaneous record/playback basis in tape recording arrangements that do not have a separate playback monitor output during the recording mode. In such arrangements, the comparison must be done by making a recording, then rewinding and playing. However, during recording, some systems lacking a separate monitor output do permit feeding the interrupted pink noise test signal from the tape to a meter, which can be read on a simultaneous record/play basis for level calibration.

When a tape recorder is playing back a previously recorded tape on which the interrupted pink noise test signal has been recorded, the third case mentioned above, the Auto Compare function operates in the playback mode, permitting testing and matching with respect to the playback portions of the system.

With respect to magnetic tape recording systems, the calibration functions of the present invention are designed only to ensure that the played back test signal matches, in level and frequency response, the test signal sent to the recorder (either at the time of the testing by simultaneously recording and playing back or at some earlier time or some earlier time and other place in the case of a tape previously recorded with the interrupted pink noise test signal). The invention does not relate to calibrating the relationship of the recorder input or output signal to the flux actually appearing on the tape, which must be done in the conventional way—namely, by the use of a standard level setting tape and a frequency response standard tape.

BRIEF DESCRIPTION OF THE DRAWINGS

FIG. 1 is a block diagram showing an overall arrangement of the invention.

FIG. 2 is a block diagram showing a variation of the overall arrangement of the invention.

FIG. 3 is a partly schematic, partly functional block diagram showing a preferred embodiment of the invention.

FIGS. 4A through 4E are a series of waveforms useful in explaining the operation of the preferred embodiment.

FIGS. 5A and 5B are a further series of waveforms useful in describing the test signal gap compensation.

FIG. 6 is a block diagram showing a modified embodiment of the invention for use in connection with multi-track tape recording systems.

FIG. 7 is a block diagram showing a further modified embodiment of the invention for use in connection with multi-track tape recording systems.

FIG. 8 is a schematic diagram showing the details of the arrangement of FIG. 6.

DETAILED DESCRIPTION OF THE PREFERRED EMBODIMENTS

Referring now to FIG. 1, a block diagram shows a general arrangement of the invention in the environment of a recording or transmission system. One of three inputs, from an input terminal 2, a calibration generator 4, and a test signal generator 6 are selected by a single-pole, three-position switch 8. Signals intended to be transmitted or recorded by the system are applied at terminal 2. Calibration generator 4 provides test signals at known levels such as the signals mentioned above for use in aligning magnetic tape recorders. Test signal generator 6 provides the test signal, preferably with an identifier, at a standard level.

The input selected by switch 8 is applied to a ganged double-pole, double-throw switch 10. In its upper position, switch 10 applies the test signal directly to a recording or transmitting means 12, which in turn applies the test signal to a recording medium or transmission channel 14. When switch 10 is in its other position, an equalizer 16 and gain setting means 18 are placed in line to the recording or transmitting means 12. In most practical arrangements, means such as equalizer 16 and gain setting means 18 are permanently connected in the input to the system.

The output from the recording medium or transmission channel 14 feeds a further ganged double-pole, double-throw switch 20, which, in its upper position, applies that output directly to playback or reproduction means 22. A reference signal generator 24 applies a reference signal, having the same basic characteristics and standard level as the test signal but preferably without any identifier, to means 22. Means 22 includes switching means to alternate the test signal and reference signal as the output signal on line 26 for application to one or more of the following: a loudspeaker 28, a meter 30, and a real time analyzer (spectrum analyzer) 32. Preferably the switching means is responsive to the test signal identifier. An equalizer 34 may be inserted in the line to the speaker 28 to assist in making easier level comparisons in particular frequency ranges.

In its other position, switch 20 places an equalizer 36 and gain setting means 38 in the output line from the medium or channel 14. Equalizers 16 and 36 along with gain setting means 18 and 38 are used to assist in bringing the recovered test signal into a match with the reference signal. The equalizers preferably operate throughout the frequency band of the system and provide adjustable boosting or attenuation in discrete regions throughout the frequency band, while the gain setting means provide an adjustable boost or attenuation throughout the frequency band. In practical systems, various other controllable parameters can be adjusted to affect gain and spectral response.

In some cases, the test signal is generated and applied to the recording medium or transmission channel at a location remote from the place of playback or reproduction from that medium or channel. In other cases, as for example where means 14 forms part of a magnetic tape recorder, recording and playback can be done at the same physical location and the test signal may be recorded and played back (with a slight delay) at the same time. In that case, a single generator can be employed as the test signal and reference signal generator in the manner shown in FIG. 2 wherein a single reference signal generator 24 has its output applied as the reference signal input to block 22 and to identifier means 40 to provide the test signal to switch 8. FIG. 2 is otherwise the same as FIG. 1 and the same reference numerals are employed with respect to the same elements and means. The preferred embodiment of FIG. 3, described below, employs a single generator in a manner similar to the arrangement of FIG. 2.

Referring now to FIG. 3, a block diagram of a preferred embodiment of the invention is shown in the environment of a noise reduction compander and magnetic tape recording system. In this figure, the only signal circuits relating to the noise reduction compander and recording system shown are those that are directly related to the calibration process, namely the noise reduction (NR) on/off function, outputs (O/P) 1 and 2 switching, and meter switching. In a practical embodiment, the invention is embodied in circuitry forming an integral part of a plug-in module that includes noise reduction circuitry, the module in turn plugging into a unit that holds one or more modules, the unit providing certain common functions to provide a noise reduction compressor, expander or switchable compressor/expander.

The calibration function logic is controlled by four user inputs:

(1) by a one-time setting of a single-pole, three-position switch 102, which has switch settings ("360", "361", or "M") for the type of NR compander unit with with the module is employed ("360"—in which an encoder is dedicated to the recording side of the system and a separate decoder is dedicated to the playback side, such as the arrangement of the Model 360 manufactured by Dolby Laboratories, Inc.; "361"—in which a switchable encoder/decoder has only one output circuit such that when acting as an encoder, the output circuit is used to apply the encoder output to the recorder input and it is not possible to simultaneously monitor a playback signal off-tape and when acting as a decoder, the output circuit drives the playback monitor, such as the arrangement of the Model 361 manufactured by Dolby Laboratories, Inc.; and "M"—, in which a switchable encoder/decoder has two output circuits such that when acting as an encoder, one output circuit is used to apply the encoder output to the recorder input and the other output circuit is used to drive a monitor for simultaneous monitoring of the playback signal off-tape, such as the arrangement of the M-, SP-, and XP-series Models manufactured by Dolby Laboratories, Inc.);

(2) by setting the recorder to the record or play function (by setting +24 volts for record or 0 volts for play on line 104), (3) by running or stopping the tape (sensed by presence of the interrupted pink noise test signal from the tape on line 106), and (4) by the operator pressing or releasing the test calibration mode ON button (indicated by the voltage on line 108).

The test calibration mode ON button (not shown) controlling line 108 is the main control input, which produces a main logic line (0 volts for test tone function ON) and an inverted line (+18 volts for test tone function ON). The test calibration mode ON logic line directly activates a yellow "test calibration mode" LED (light emitting diode) 110 on the front of the module.

In FIG. 3, logic symbols are used for clarity to indicate functions, but actual implementation on the circuitry is by resistors, diodes, and transistors as is well known in the art. The logical inverting functions are provided by transistors or arise from the circuit configurations used.

For the electronic switches the nominal changeover voltage from one state to another is +9 volts. For simplicity the control voltages are shown as either 0 volts or +18 volts, even though in practice the voltages may be in the ranges 0–6 volts and 12–18 volts, respectively.

Normal Signal Operation

In normal, non-calibrate, mode the test calibration mode ON button is not pressed (line 108 is +18 volts); therefore, the two signal switches 112 and 114 are each in their input/tape position (position 112a and position 114a, respectively), the meter switch 116 is in the normal position 116a, and the normal/Auto Compare switch 126 is in the normal position 126a. These conditions are obtained as follows. Line 108 is applied to an inverter 115 so that the output from the inverted calibration mode logic line is 0 volts. This signal is applied to one input each of NAND gate 118, AND gate 120, AND gate 121, and AND gate 122. The output of AND gate 121 is 0 volts. The output of OR gate 124 is therefore 0 volts, which locks the Output 1 switch 114 in the input/tape position 114a. The 18 volt output of the NAND gate 118 locks switch 126 in the normal position, resulting in a switch output voltage of 9 volts (the red and green LEDs 128 and 129, respectively, are therefore off). The 9 volt signal is also fed through attenuator 130 (times about 0.7) to one input of the OR gate 131. Point 132 provides an Auto Compare control signal for external use. The other input to OR gate 131 is 0 volts, since the AND gate 120 output is 0 volts (the attenuation is not sufficient so that the 9 volt signal blocks AND gate 120). Therefore the OR gate 131 will have an output of 0 volts, resulting in locking the Output 2 switch 112 in the input/tape position 112a.

The meter 164 is connected to the metering point 134 through the meter switch 116. The switch is in the normal position 116a because it is controlled by the main (non-inverted) calibrate mode line 108, which is positive (+18 volts) in the non-calibrate mode.

When the calibrate mode ON button is not pressed, the above conditions for switches 112, 114, and 116 are independent of the record/play mode (line 104) or the position of switch 102.

Test Calibration Mode (Auto Compare)

When the calibrate mode ON button is pressed, the associated noise reduction (NR) circuits (not shown) preferably are switched off. This is done by the AND gate 136, one input of which is the NR pilot detector 137 output. The NR pilot signal is used for remotely switching the associated NR circuits. The input to detector 137 is received from the associated NR circuitry (not shown) on line 139. The other input to AND gate 136 is the main calibrate mode logic line 108, which falls to 0 volts when the calibrate mode ON button is pressed. The output of the AND circuit 136 therefore falls to 0 volts and switches off the NR switch 138.

The pink noise generator 140 is left running all the time, in order to provide an external pink noise test signal output for other uses. Pink noise generator 140 includes a white noise generator integrated circuit (one suitable IC is the Motorola MC14040B) and external conventional "pinking" filtering. White noise generators using integrated circuits are highly accurate and provide excellent sources from which stable, accurate pink noise generators can be built. The 120 kHz clock signal available from the white noise generator IC is used to provide the NR pilot signal for remote switching of the noise reduction function. When the calibration mode ON button is pressed, the pink noise generator switch 142 is switched on. Use of such a switch is preferred to suppress crosstalk in the signal switches 112 and 114, which would otherwise impair the noise performance of the system. The switch 142 also reduces the possibility of capacitive coupling of noise via the circuit components and traces.

When the calibration mode ON button is pressed pulse generator (nick generator) 144 starts. A fresh start is necessary each time the button is pressed in order to establish the audible time sequence of the interrupted pink noise test signal sound as quickly as possible. Generator 144 is a multivibrator providing a train of positive going pulses 20 milliseconds long every two seconds (½ pps).

The output of pulse generator 144 is fed to one input of the AND gate 146. The other input to AND gate 146 is fed by the incoming record/play mode information from the tape recorder (nominally +24 volts for record, 0 volts for play), after limiting the voltage to +18 volts in voltage limiter 148 to avoid any potential damage to subsequent circuitry. If the recorder is in the record mode the output of the AND gate 146 is fed to the test signal 20 ms gap switch 147 to provide the identifying interruptions. The resulting interrupted pink noise test signal is then passed to the test signal/reference signal terminal of switch 112. Output 2 (O/P 2), normally the output to the recorder, is taken either from that terminal or the above mentioned input/tape terminal depending on the position of switch 112.

The played back interrupted pink noise test signal is subject to logic which creates the Auto Compare (test calibration mode) alternating sequence control signal, which in turn is used to select alternately the recovered test signal from the tape and the internal reference signal. These signals appear at Output 1 (O/P 1) and/or Output 2 (O/P 2), depending on the NR unit type and the record/play operating mode.

Referring also to FIGS. 4A through 4E, the Auto Compare switching signal, the switching signal for the Auto Compare alternating signal time sequence, is established as follows. The returning interrupted pink noise test signal from the tape on line 106 (FIG. 4A) preferably is 3 kHz high pass filtered, rectified, and smoothed (2×1 ms) in block 149. This processing of the pink noise test signal suppresses low frequency amplitude fluctuations in the pink noise so that the smoothing time constants can be small enough to respond to the 20 ms signal interruptions. The resulting DC signal, having a level of about 80 millivolts, is then applied to comparator 150, which is biased at about 30 millivolts. Comparator 150 acts as a limiter to provide clean, high amplitude ½ pps (pulses per second) pulses (FIG. 4B) for application to divider circuit 152, which divides the pulses by 4, counting each upstroke and downstroke and shifting polarity on the downstroke edge of the incoming tape pulses (beginning of 20 ms period). The resulting ⅛ Hz symmetrical square wave (FIG. 4C) is then fed through a 20 ms upstroke delay circuit 154 to create a very slightly asymmetrical square wave (FIG. 4D) which is used as the Auto Compare control signal for various switching functions. The positive going portion of the square wave (+18 volts) defines the internal reference signal portion of the sequence, while the negative going portion (0 volts) defines the tape portion (the played back test signal). In the final signal heard by the listener (FIG. 4E)—4 seconds tape, 4 seconds internal reference—the 20 ms delay causes the end-of-tape 20 ms tape gap to appear in the output sequence. Strictly speaking then, the tape period is 4.020 seconds, nominal, and the internal reference period is 3.980 seconds. Each tape period heard thus contains three gaps or nicks. FIGS. 4A through 4E are not to scale.

In order to stop and restart the perceived Auto Compare time sequence as quickly as possible in the event that the tape is stopped and restarted (indicated on line 106) or that the calibration mode ON button is released and then re-pressed (indicated on line 108), signals identifying these events are used to reset divider circuit 152 to the "tape mode" or that portion of the Auto Compare time sequence which selects the tape signal (as described below, OR gate 159 drives the divider reset input). The tape stop event is identified by taking the tape signal from the comparator 150 and peak holding (in block 156) the signal for 50 ms (delaying the downstroke for 50 ms). With running interrupted pink noise from the tape, the 50 ms delay covers the tape gaps or nicks, so that the output from the delay 156 remains in the tape run mode (+18 volts). When the tape is running and the calibration mode is ON, the inputs to both inputs of NAND gate 158 are high and, consequently, its output is 0 so that no reset signal is applied to divider 152. Within 50 ms after the tape stops, a 0 volt signal is fed to one input of the NAND gate 158, and any change from calibration mode line ON to OFF acts immediately. Either condition causes NAND gate 158 to deliver a positive signal to the OR gate 159, which provides a positive reset signal to the divider 152. The divider output then reverts to the 0 volt tape mode, where it stays until the reset signal is removed and further pulses are derived from the tape interrupted pink noise test signal. Thus, if the tape should be stopped or the calibration mode ON button is released during the 4 second internal reference period (that portion of the Auto Compare time sequence which selects the internal reference signal), the signal that is heard stops essentially immediately when the test calibration mode line goes to OFF or at least fast enough to be perceived as immediate (within 50 ms or so) when the tape is stopped.

The first signal heard following a user-caused interruption is thus the test signal from the tape, which will be for a period of four seconds if the interruption was caused by releasing the calibrate mode ON button or by stopping and then restarting the tape in the record mode.

If a tape with previously recorded interrupted pink noise is stopped and then restarted in the play mode, then the first signal heard will be a tape segment between two and four seconds in length, containing two sections of pink noise and two 20 ms tape nicks. Thus most of the time the starting sequence is perceptibly similar to the normal sequence (depending on the exact starting point on the tape). This allows the operator to mentally lock on to the timing sequence as quickly as possible.

In the calibrate mode, the meter circuit output is derived from Output 1. However, the signal is subject to the Output 1 switching logic (controlling switch 114) and to a further logical condition, namely, operation of the calibration mode button (controlling line 108). When the calibrate mode ON button is pressed, the meter switch 116 always goes into the calibrate mode position; otherwise the switch remains in the normal mode—that is, connected directly to the normal metering point 134. Attenuator 161 in the line from point 134 matches the signal level to that of the band-limited interrupted pink noise coming from bandpass filter 160 (having single pole sections with a bandpass of about 200 Hz to 4 kHz). Filter 160 reduces meter bounce. Meter amplifier 162 driving meter 164 has a gain sufficient to restore the attenuated signals from the metering point 134 to a level providing the correct reading on the meter.

When the interrupted pink noise is read by the meter circuit, the 20 ms tape nicks cause a slight momentary fall in the meter reading. This drop is slightly larger than the fluctuations caused by the band limited pink noise. In order to reduce this disturbance, the tape nicks, as read by the meter are filled with a compensating signal. This is accomplished by differentiating (in differentiator 166 having a 2 ms time constant) the tape gap signal derived from the comparator 150 and adding the result to the meter signal, via a point in the bandpass filter 160.

FIGS. 5A and 5B depict the effect of the differentiation: FIG. 5A is a portion of the signal from comparator 150 which includes an interruption and FIG. 5B shows the effect of differentiator 160. The AND gate 168 and the inverter 169 prevent the compensation signal from being added except when required. Another method of providing tape gap compensation is to control switch 114 so as to switch over to the reference signal during the tape gaps. The gaps thus are filled with pink noise from the reference generator 140.

Because of the different ways that that module containing the calibration circuitry is configured and used in the Models 360, 361, and M-Series units, it is necessary to provide information to the module as to which type of NR unit in which the module is used. This is accomplished by the three-way switch 102, which in the practical embodiment, is situated under the back of the top cover, mounted on the main circuit board. This switch is set to the correct position before the module is inserted into the NR unit.

Consider first, the M-series record and calibrate ON modes. If switch 102 is in the M-Series position, the output of the NOR gate 170 will be positive. This allows the NAND gate 118 to pass the calibrate mode button "on" information directly to the switch 126, placing it in the Auto Compare position 126b. The red and green Auto Compare LEDs (128, 129) are then illuminated in accordance with the Auto Compare alternating sequence comiong from the 20 ms upstroke delay 154, as discussed above. The red and green information is also passed to a terminal of the edge connector for external use.

The Auto Compare signal from switch 126 is also passed to the AND gate 122 through the times about 0.7 attenuator 72. Since the other input of the gate 122 is positive in the calibrate ON mode and the attenuation at the input from attenuator 172 is not enough to block the gate, the Auto Compare alternating sequence control signal appears at the output and proceeds to the OR gate 124. The Auto Compare signal passes through the OR gate (the other input of which is 0 volts) to control the Output 1 switch 114, switching it between the input/tape position 114a and ther reference signal position 114b in accordance with the Auto Compare sequence, causing that sequence to appear at Output 1, the monitor output. A buffer amplifier 173 connects switch 114 to Output 1.

The record and calibrate mode ON inverted logic signals appear at the AND gate 120. The positive gate output is applied to one input of the OR gate 131, which then provides a positive control signal to switch 112, placing it in the test signal position 112b. The interrupted pink noise test signal is thereby passed to Output 2, the output to the the tape recorder input. A buffer amplifier 174 connects switch 112 to Output 2.

In the M-Series play and calibrate ON mode everything is the same as the record and calibrate ON mode just described, except that the interrupted pink noise generator is switched off because a previously recorded tape with the test signal recorded thereon is being played.

The meter signal in the record and calibrate ON mode is the Auto Compare sequence from the tape and internal generator, via switch 114. Three tape gaps per 8 Hz cycle are compensated by the differentiator 166 and the AND gate 168. The middle input is positive; the top input is positive during the tape sections of the sequence. Therefore the tape gap pulses from the comparator 150 applied to the lower input of AND gate 168 pass through to the differentiator during the tape portions of the Auto Compare sequence.

In the play and calibrate ON mode the meter signal arrangements, including tape gap filling, are the same as in the record mode.

The operation with Model 361 units is similar to the M-Series, except that the Auto Compare function is not operative in the record mode (there is no dedicated "To Monitor" line amplifier connected to Output 1). When switch 102 is in the 361 position and the system is in the record and calibrate ON mode, the NOR gate 170 provides a 0 volt output, which in turn results in a positive output from the NAND gate 118. Thus switch 126 is locked in the normal position 126a, so that the Auto Compare LEDs (128, 129) are not illuminated.

Meanwhile the output condition of the AND gate 120 is the same as with the M-Series, namely positive. This signal is applied to one input of the OR gate 131. Therefore, a positive control signal passes through to switch 112, placing it in the test signal position 112b, which results in the interrupted pink noise at Output 2, the output to the tape recorder input when the unit is in the record mode.

With Model 361 units in teh playback mode the operation is the same as with the M-Series except that the Auto Compare signal is taken from Output 2 rather than Output 1: Output 2 is the normal 361 playback output. Thus, in the play and calibrate mode ON condition, the output of the NOR gate 170 is positive. The results in a 0 volt output from NAND gate 118, placing switch 126 in the Auto Compare mode. TheAuto Compare LEDs (128, 129) are illuminated and the AutoCompare alternating sequence control signal is fed to one input of the OR gate 131. The other input of the gate comes from the AND gate 120 output, which is 0 volts. Thus the Output 2 switch 112 is switched between the tape position 112a and the reference signal position 112b in accordance with the Auto Compare control signal sequence causing that sequence to appear at Output 2, the monitor output in the 361. The reeference signal appears at position 112b of the switch because in the play mode the output of limiter 48 is 0 volts. Therefore, the output of the AND gate 47 is 0 volts, which keeps switch 147 closed.

The meter signal in the record and calibrate ON mode is simply the interrupted pink noise from the tape, with all tape gaps or nicks filled. There is no audible Auto Compare possibility in the Model 361 record mode, so there is little point in providing an Auto Compare switching signal to the meter circuit. This arrangement is provided by the NOR gate 170 followed by NAND gate 118, which locks the Auto Compare control switch 126 in the normal position 126a (Auto Compare LEDs off). Meanwhile, a positive signal is present at the lower input of AND gate 122. The other input comes from the output of switch 126 (+9 volts in the "normal" mode), via the attenuator 172. The attenuation is enough (times about 0.7) to lock the AND gate output to 0 volts. This input of OR gate 124 is therefore 0 volts. The other input is also 0 volts, so that the gate output is 0 volts, locking Output 1 switch 114 in the tape position 114b. Thus the signal to the meter 164 is the interrupted pink noise from the tape.

The tape gap filling logic in the record and calibrate mode ON mode is provided by switch 102 and the OR gate 159; this applies a positive reset signal to the divider 152, which then yields an output of 0 volts. The output of the upstroke delay circuit 154 is 0 volts, which results in a positive signal to the top input of AND gate 168. The middle input is positive, which results in all of the tape gap compensation pulses at the lower input being passed through to the differentiator 166.

The meter signal in the play and calibrate ON mode comes via Output 1 and switch 114; the meter reads the Auto Compare signal sequence and the red and green LEDs (128, 129) are illuminated appropriately. Control for this is as follows. In the play mode the output of the NOR gate 170 is positive, which is applied to one input of the NAND gate 118. The other input is the inverted calibrate mode ON logic input (positive). The output of the NAND gate is therefore 0 volts, which locks the Auto Compare control switch 126 in the Auto Compare position 126b. This provides signal to the red and green LEDs. The Auto Compare control signal is also attenuated (times about 0.7) and fed to the AND gate 122. The attenuation is not enough to prevent the Auto Compare control signal being passed to the OR gate 124. The lower input of the gate is 0 volts, so the gate output comprises the Auto Compare control sequence signal, which then controls switch 114 causing it to alternate between the tape signal at position 114a and the reference signal at position 114b.

Tape gap compensation in the play and calibrate ON modes is the same as in the M-Series condition discussed above.

With Model 360 units, one unit is dedicated to the record mode, another to the play mode. Thus, in contrast to the Model 361, simultaneous record/play Auto Compare operation is possible. In the record and calibrate mode ON condition, the Switch 102 causes the NOR gate 170 to provide a 0 volt output. The output of the NAND gate 118 is then positive, which locks the Auto Compare control switch 126 in the normal position 126a (record unit Auto Compare LEDs off). Meanwhile, AND gate 120 has a positive output, giving a positive output from the OR gate 131, which locks the Output 2 switch 112 in position 112b in which it receives the interrupted pink noise test signal.

In the Model 360 play and calibrate mode ON condition the output from NOR gate 170 is positive and the output of NAND gate 118 is negative, thereby enabling the Auto Compare function via switch 126. The red and green LEDs are illuminated appropriately. The output of the AND gate 120 is 0 volts. The Auto Compare control signal from switch 126 is then attenuated (times about 0.7) and passed by the OR gate 131 (the attenuation is not enough to block the gate) to control Output 2 switch 112. The Auto Compare sequence thus appears at the output O/P 2.

Record and calibrate mode ON mode metering is provided as follows. Switch 102 passes a positive signal to AND gate 121. The other input of the gate is also positive, being the inverted calibrate ON mode logic signal. AND gate 121 therefore passes a positive signal to the OR gate 124. The positive output of the gate then locks the Output 1 switch 114 in the reference position 114b. This passes pure pink noise to the bandpass filter 160 and on to the meter circuit. Since the signal appearing on the meter 164 is internally generated pink noise, there is no need for tape gap compensation; the compensation signal is blocked by the NOT circuit 176 preceding the middle input of AND gate 168. The meter 164 reading provides a status indication to the operator and a suggestion of what to look for on the meter of the playback unit (not shown).

In the play and calibrate mode ON mode metering arrangement, the auto Compare control signal is attenuated by attenuator 172 (times about 0.7) and applied to one input of AND gate 122. Since the lower input is positive and the attenuation at the upper input is not enough to block the gate, the Auto Compare signal passes to the OR gate 124. The other input of OR gate 124 is 0 volts, since the AND gate 121 has 0 volts at one input. The Auto Compare signal thus passes through the gate to control the Output 1 switch 114 in the Auto Compare mode. Switch 114 thus alternately selects the test signal from the tape and the internal reference signal, which are then fed through the bandpass filter 160 and on to the meter circuit. Tape gap compensation is provided by AND gate 168 in the same way as in the Model 361 and M-Series play modes.

When the present invention is used in multi-track tape magnetic recording applications, it is desirable to synchronize the 20 millisecond gaps (or "nicks") in the test signal recorded on the various tracks in order to expedite calibration and alignment of the multiple tracks. Accomplishing such synchronization is straightforward if all the tracks are recorded at the same time, as a common test signal generator can be used. However, the tracks typically are recorded at different times or in different recording studios, requiring additional means for achieving nick synchronization. This can be accomplished by using the first track (or tracks) recorded as a "master" track for the purposes of synchronizing the test signal nicks on all of the tracks of the multi-track recording. Subsequently recorded tracks are "slave" tracks that have their nicks synchronized to the master track. The master track (or tracks) are selected by placing that track (or tracks) in the "sync" or "overdub" mode on the multi-track recorder (in that mode, the record head, rather than the spaced-away playback head, serves as the replay head).

In a preferred arrangement, each track of a multi-track recording system has dedicated to it a circuit such as that of FIG. 3, with the exception that only a single pink noise generator and a single nick generator (one-half pulse per second generator) is provided for all of the tracks in order to reduce cost. As discussed above in connection with the the description of FIG. 3, the interrupted pink noise test signal played back from the tape is high pass filtered, rectified, smoothed and fed to a comparator (as in blocks 149 and 150 of FIG. 3). In the multi-track arrangement, the output signal from each track is independently treated in that manner by the dedicated circuit associated with it. The comparator signal from the master track (or tracks, although the signal from one track of several simultaneously recorded is sufficient) is used to provide synchronization. Although any previously recorded track can be used for synchronization, it is preferred to use the earliest recorded track as the master track because the processing in block 149 results in a 2 ms delay and could cause a build-up of delays.

FIG. 6 shows a block diagram of the pink noise generator, nick generator, and other means for use commonly with all of the tracks of the multi-track recording system for recording the interrupted pink noise test signal and synchronizing the nicks (or gaps) of the test signal on one or more newly recorded tracks to that on one or more previously recorded tracks.

Referring to FIG. 6, the signals from the comparators 150 (FIG. 3) of tracks 1 through n are each AC coupled via a capacitor 202 and summing resistor 204 to a summing amplifier and limiter 206, preferably an inverting operational amplifier. The limiting effect is useful in causing the output pulses to be the same amplitude regardless of the number of channels contributing pulses from their comparators. The AC coupling prevents steady signals on the tape (e.g., tones), or no signal, from interfering with the synchronization. The most negative going signals, the 20 ms negative pulses, are thereby transferred to the input of the amplifier/limiter 206. The output of amplifier/limiter 206 is nominally near the positive supply voltage in the circuit, except for the negative going nicks. Preferably, means (not shown) are provided to de-activate the comparator in any track so as to disable the output from that track, if, for example, music signals might be on that track.

The inverted pulses (an inverted form of FIG. 4B) are applied to a peak rectifier and hold circuit 208 and to a sync latch 212 via a unity gain buffer 210. Sync latch 212 also receives as an input the signal from the test calibrate mode ON line 108 (FIG. 3) via resistor 214 and diode 216. Peak rectifier 208 has a sufficiently long hold time constant such that if pulses are present at its input, the output remains high. In the absence of pulses at its input, the output of the peak rectifier is low. Sync latch 212 provides a high output in its "sync" mode and a low output in its "free run" mode. Sync latch 212 may be implemented using logic circuitry or with an operational amplifier as described below (when implemented using an operational amplifier, diode 216 cooperates in performing the latch function).

In the sync mode, switch 218 is closed, feeding pulses from the amplifier/limiter 206 to the nick generator 226, and LED 222, fed via resistor 220, is lit. In the free run mode, switch 218 is open, the nick generator is free running, and LED 224 is lit. Sync mode LED 222 is preferably a first color, such as yellow, and free run mode LED 224 is preferably a second color, such as green. If no input is applied to the nick generator (multivibrator) 226 (which corresponds in its free run mode to the one-half pulse per second generator 144 in the circuit of FIG. 3) it is free running, in the sense that it is not synchronized to any outside reference (however, it does maintain accurate pulse generation timing), and generates the same pulses as the ½ pulse per second generator 144 (FIG. 3). If the processed off-tape pulses are applied to it via switch 218, it operates in its sync mode and synchronizes itself to those offtape pulses.

Connection to the multivibrator 226 must be made in such a way that the period of the device increases when the connection is made. In this way, positive synchronization is maintained even though the natural period of the multivibrator may be slightly less than that of the incoming tape pulses. In the sync mode, the nick generator 226 also has the important property that it introduces a dead time following each pulse such that it is immune to the influence of additional pulses closely following each synchronizing pulse. The nick generator of FIG. 6 is common to all of the channels and the test signal from the arrangement of FIG. 6 is applied to the record inputs of all the tracks via a test signal bus (not shown). Tracks on which it is desired to record the test signal are placed in their respective record mode.

Continuing the description of FIG. 6, the factor controlling the mode of operation (sync mode or free run mode) of the latch 212 and nick generator 226 is the time of depressing the test calibration mode ON button (that controls line 108, FIG. 3) in relation to the arrival of pulses from the tape. If no pulses come from the tape (blank tape), then the nick generator free runs after the test calibration mode ON button is depressed. If the tape has previously recorded tracks, then the tape nicks will be detected and the circuit will be put into the synchronized mode, provided that the test calibration mode ON button is not already depressed when the first pulses arrive. Thus the test calibration mode ON button should be depressed after the first pulses come from the tape; the nick generator 226 will then be synchronized to the tape nicks so as to interrupt the pink noise generator 228 (140 in FIG. 3) output via switch 230 (147 in FIG. 3) to provide an interrupted pink noise test signal, available for recording on the slave tracks, having its nicks synchronized with the nicks of the master track. The test calibration mode ON line also resets the nick generator 226.

When the test calibration mode ON line (108, FIG. 3) goes on, the synchronized test signals are recorded on whichever of the slave tracks are set in their record mode. If the newly recorded tracks or any previously recorded tracks that are not in the overdub mode have their comparators activated they will apply additional pulses to nick generator 226 that are slightly delayed with respect to the master track pulses (the delay, about 100 ms, will depend on the distance between the record head and playback head spacing and on the tape speed). However, due to the inherent property of the nick generator (multivibrator) 226 to reject pulses occuring shortly after the master pulses to which it is synchronized (e.g., shortly after its change of state), the slave track pulses will have no effect on the operation of the circuit (if the particular multivibrator or generator used does not have this characteristic, it can be provided by additional circuitry). Thus, the newly recorded channels can operate in the normal record-play state; on the channel chosen as the master track must be in the sync or overdub mode.

As mentioned above, although the sync latch 212 may be implemented using logic circuits (gates, for example), a simple way to implement the latch is to use an operational amplifier with positive feedback. The feedback resistor has a value of about 1 megohm, the feed resistor from buffer 210 has a value of about 680 kilohms, and the feed resistor 214 from the test calibrate mode ON line has a value of about 820 kilohms. The arrangement thus functions in the manner of a logic circuit, in any case the condition of two of the three inputs (the feedback input being one of the three) controls despite the condition of the third input. It should also be noted that the on and off levels of the test calibrate mode ON line is altered from that in FIG. 3 such that the line is at the positive supply voltage in the off condition and at the negative supply voltage in the on condition. Thus, for example in a new recording situation when no pulses are being received and the test calibrate mode ON button is pressed, the output of buffer 210 is low and the line to diode 216 is also low causing the operational amplifier output and positive feedback also to be low. This establishes the free run mode. When pulses are then received (from the playback of the tracks being recorded) the output of buffer 210 goes high. However, this cannot affect the output of the operational amplifier because its other two inputs remain unchanged.

In the case where slave tracks are to be synchronized to a master track, initially no off-tape pulses are being received and the test calibrate mode ON line is off. The output of buffer 210 is low and the off condition of the test calibrate mode ON line has no effect due to diode 216. Thus, the output of the operational amplifier is low and the positive feedback is low. As soon as off-tape pulses are received (from the master track) the output of buffer 210 goes high. The operational amplifier output and feedback also go high causing a changeover to the sync mode because the other input continues to have no effect. When the test calibrate mode ON line goes to on (causing it to go low), there is no change in the output because the other two inputs to the operational amplifier remain high.

The arrangement of FIG. 6 provides essentially automatic operation. Some recording engineers may prefer to have manual control over the sync and free modes. FIG. 7 shows such an alternative in which the inputs from the various tracks are applied to an amplifier/limiter 206 (as in FIG. 6) and then directly to the multivibrator 226 (also as in FIG. 6) via a manually operated single-pole, single-throw switch 232. In its open position the circuit is in the free run mode, in its closed postion the circuit is in the sync mode. The nick generator 226 interrupts the output of pink noise generator 228 by controlling switch 230 as in FIG. 6.

Another possible modification to either the arrangement of FIG. 6 or the arrangement of FIG. 7 is to utilize the nick generator 226 only in its free running mode and to use the pulses produced by the amplifier/limiter 206 from the master track as the control for switch 230.

FIG. 7 is a schematic circuit diagram showing the details of the arrangement of FIG. 6.

I claim:

1. Apparatus for use in calibrating an audio recording medium or an audio transmission channel, comprising,
   means for generating a test signal, said test signal comprising a wide frequency range signal having simultaneous frequency components throughout the audio spectrum and having, as a repetitive identifier, brief interruptions of a substantially fixed time period of the wide frequency range signal occurring periodically, wherein the time period of the interruptions is long enough to be heard in a reverberant room yet short enough to avoid disrupting the ear's ability to determine the level and spectral content of the wide frequency range signal, and
   means for applying said test signal to said recording medium or said transmission channel.

2. The apparatus of claim 1 wherein the apparatus is for use in calibrating a multi-track audio tape recorder/reproducer, wherein said means for generating a test signal synchronizes itself to the timing of the repetitive identifier of a previously recorded test signal played back by a record head functioning as a playback head in at least one track, thereby generating a synchronized test signal, and said means for applying said test signal to said recording medium applies said synchronized test signal to one or more of the other tracks.

3. The combination of claim 1 wherein the interruptions are in the order of 20 milliseconds in length and repeat substantially every two seconds.

4. The combination of claims 1 or 3 wherein said wide frequency range signal is a pink noise signal.

5. Apparatus for use in calibrating the playback from an audio recording medium or the reproduction from an audio transmission channel, the recording medium having a test signal recorded thereon or the transmission channel having a test signal applied thereto, the test signal having the characteristics substantially of a wide frequency range signal including frequency components throughout the audio spectrum and the test signal having a repetitive identifier, the apparatus comprising
   means for recovering said test signal from the recording medium or transmission channel,
   means for generating a reference signal having the characteristics substantially of said wide frequency range signal,
   said means receiving said recovered test signal also receiving said reference signal, said means including switching means responsive to said repetitive identifier in the recovered test signal for alternately selecting as an output signal said recovered test signal and said reference signal.

6. The combination of claim 5 wherein said switching means provides an indication as to which signal is selected as the output signal.

7. The combination of claim 5 wherein said repetitive identifier constitutes brief interruptions of the wide frequency range signal occurring periodically.

8. The combination of claim 7 wherein said reference signal is uninterrupted and wherein said switching means selects said test signal so as to begin and end selections of the test signal as the output signal with an interruption and to have at least one interruption between the interruptions beginning and ending such selections of the test signal, and said switching means alternately selects said reference signal as the output signal for time periods substantially equal to the time periods of selection of the test signal, whereby the interruptions distinguish the test signal from the reference signal.

9. The combination of claim 8 wherein the interruptions are in the order of 20 milliseconds in length and repeat substantially every two seconds, said switching means provides for one interruption between the interruptions beginning and ending selections of the test signal, and the time periods during which the test signal and the reference signal are alternately the output signal are about four seconds.

10. The combination of claim 9 further comprising a meter and signal processing means in the signal path to said meter receiving said output signal, said signal processing means generating signals to compensate for interruptions in said test signal, whereby the meter is less affected by said interruptions.

11. The combination of claim 9 further comprising a meter and signal processing means receiving said output signal for limiting the bandwidth of said output signal and applying the bandwidth limited signal to said meter, whereby the effect on the meter reading of frequency response errors in the system is reduced and the stability of the reading is increased.

12. The combination of claim 11 wherein the bandwidth is limited so as to extend from about 200 Hz to about 4 kHz.

13. The combination of claim 8 further comprising a meter and signal processing means receiving said output signal for limiting the bandwidth of said output signal and applying the bandwidth limited signal to said meter, whereby the effect on the meter reading of frequency response errors in the system is reduced and the stability of the reading is increased.

14. The combination of claim 13 wherein the bandwidth is limited to so as to extend from about 200 Hz to about 4 kHz.

15. The combination of claim 8 further comprising a meter and signal processing means in the signal path to said meter receiving said output signal, said signal processing means generating signals to compensate for interruptions in said test signal, whereby the meter is less affected by said interruptions.

16. The combination of any of claims 5 through 15 wherein said wide frequency range signal is a pink noise signal.

17. Apparatus for use in calibrating a system for recording signals on and playing back signals from an audio recording medium or for applying signals to and reproducing signals from an audio transmission channel, comprising
   means for generating a reference signal and a test signal, said reference signal having the characteristics of a wide frequency range signal including frequency components throughout the audio spectrum, said test signal having the same characteristics as said reference signal with the additional characteristic of a repetititive identifier,
   means for recording said test signal on said recording medium or applying said test signal to said transmission channel,
   means for recovering said test signal from said recording medium or from said transmission channel, and
   means receiving said reference signal and said recovered test signal, said means including switching means responsive to the repetitive identifier in said test signal for providing an output signal alternating between said reference signal and said recovered test signal.

18. The combination of claim 17 wherein said switching means provides an indication as to which signal is selected as the output signal.

19. The combination of claim 17 wherein said repetitive identifier constitutes brief interruptions of the wide frequency range signal occurring periodically.

20. The combination of claim 19 wherein said reference signal is uninterrupted and wherein said switching means selects said recovered test signal so as to begin and end selections of the recovered test signal as the output signal with an interruption and to have at least one interruption between the interruptions beginning and ending such selections of the recovered test signal, and said switching means alternately selects said reference signal as the output signal for time periods substantially equal to the time periods of selection of the recovered test signal, whereby the interruptions distinguish the recovered test signal from the reference signal.

21. The combination of claim 20 wherein the interruptions are in the order of 20 milliseconds in length and repeat substantially every two seconds, said switching means provides for one interruption between the interruptions beginning and ending selections of the played back or reproduced test signal, and the time periods during which the played back or reproduced test signal and the reference signal are alternately the output signal are about four seconds.

22. The combination of claim 21 further comprising a meter and signal processing means in the signal path to said meter receiving said output signal, said signal processing means generating signals to compensate for interruptions in said test signal, whereby the meter is less affected by said interruptions.

23. The combination of claim 21 further comprising a meter and signal processing means receiving said output signal for limiting the bandwidth of said output signal and applying the bandwidth limited signal to said meter, whereby the effect on the meter reading of frequency response errors in the system is reduced and the stability of the reading is increased.

24. The combination of claim 23 wherein the bandwidth is limited to so as to extend from about 200 Hz to about 4 kHz.

25. The combination of claim 20 further comprising a meter and signal processing means receiving said output signal for limiting the bandwidth of said output signal and applying the bandwidth limited signal to said meter, whereby the effect on the meter reading of frequency response errors in the system is reduced and the stability of the reading is increased.

26. The combination of claim 25 wherein the bandwidth is limited to so as to extend from about 200 Hz to about 4 kHz.

27. The combination of claim 20 further comprising a meter and signal processing means in the signal path to said meter receiving said output signal, said signal processing means generating signals to compensate for interruptions in said test signal, whereby the meter is less affected by said interruptions.

28. The combination of any of claims 17 through 27 wherein said wide frequency range signal is a pink noise signal.

29. A recorded medium having a test signal recorded thereon, said test signal having the characteristics substantially of a wide frequency range signal having simultaneous frequency components throughout the audio spectrum and having, as a repetitive identifier, brief interruptions of a substantially fixed time period of the wide frequency range signal occurring periodically, wherein the time period of the interruptions is long enough to be heard in a reverberant room yet short enough to avoid disrupting the ear's ability to determine the level and spectral content of the wide frequency range signal.

30. The recorded medium according to claim 29 wherein the interruptions are in the order of 20 milliseconds in length and repeat substantially every two seconds.

31. A method of calibrating the playback from an audio recording medium or the reproduction from an audio transmission channel, the recording medium having a test signal recorded thereon or the transmission channel having a test signal applied thereto, the test signal having the characteristics substantially of a wide frequency range signal including frequency components throughout the audio spectrum and including a repetitive identifier, comprising generating a reference signal having the characteristics substantially of said wide frequency range signal, playing back or reproducing said test signal from the recording medium or transmission channel, alternately selecting as an output signal said played back or reproduced test signal and said reference signal, comparing the alternating test signal to said reference signal, and adjusting the level and spectral balance of the playing back or reproducing of said test signal in response to the comparing so as to reduce differences between it and said reference signal.

32. The method of claim 31 wherein said repetitive identifier constitutes brief interruptions of the wide frequency range signal occurring periodically.

33. The method of claim 31 wherein the alternately selecting is done in response to said repetitive identifier.

34. The method of any of claim 31 through 33 wherein said wide frequency range signal is a pink noise signal.

35. A method of calibrating an audio recording apparatus and recording medium or an audio transmitting apparatus and transmission channel, comprising applying a test signal to the audio recording apparatus or audio transmitting apparatus, the test signal comprising a wide frequency range signal including frequency components throughout the audio spectrum and including a repetitive identifier, generating a reference signal having the characteristics substantially of said wide frequency range signal, recovering, using calibrated play back or reproduction apparatus, said test signal from the recording medium or transmission channel, alternately selecting as an output signal said recovered test signal and said reference signal, comparing the alternating recovered test signal to said reference signal, and adjusting the level and spectral balance of the recording apparatus and recording medium or the transmitting apparatus and transmission channel in response to the comparing so as to reduce differences between said recovered test signal and said reference signal.

36. The method of claim 35 wherein said repetitive identifier constitutes brief interruptions of the wide frequency range signal occurring periodically.

37. The method of claim 35 wherein the alternately selecting is done in response to said repetitive identifier.

38. The method of any of claim 35 through 37 wherein said wide frequency range signal is a pink noise signal.

39. A method of calibrating the spectral response of a system for recording signals on and for playing back signals from a recording medium or for applying signals to and reproducing signals from a transmission channel, comprising generating a reference signal and a test signal, said reference signal having the characteristics of a wide frequency range signal, said test signal having the same characteristics as said reference signal with the additional characteristic of a repetititive identifier, recording said test signal on said recording medium or applying said test signal to said transmission channel, playing back said test signal from said recording medium or reproducing said test signal from said transmission channel, alternately selecting as an output signal said played back or reproduced test signal and said reference signal, comparing the alternating played back or reproduced test signal to said reference signal, and adjusting the level and spectral balance in the system in response to the comparing so as to reduce differences between the played back or reproduced test signal and said reference signal.

40. The method of claim 39 wherein said repetitive identifier constitutes brief interruptions of the wideband noise signal occurring periodically.

41. The method of claim 40 wherein the alternately selecting is done in response to said repetitive identifier.

42. The method of any of claims 39 through 41 wherein said wideband noise signal is a pink noise signal.

43. The combination of claim 8 wherein said switching means includes divider means responsive to the beginning of said interruptions for generating a square wave having a transition at the beginning of each second interruption and means for delaying one transition of said square wave by the time length of an interruption to derive an asymmetrical square wave, said asymmetrical square wave defining the time periods during which the reference signal and test signal are selected as the output signal, the longer portion of the asymmetrical square wave including said delay defining the test signal time period, whereby the test signal time period begins and ends with an interruption and includes an interruption between the beginning and ending interruptions.

44. The combination of claim 43 wherein said divider means includes means responsive to the cessation of said recovered test signal for resetting said divider means.

45. The combination of claim 20 wherein said switching means includes divider means responsive to the beginning of said interruptions for generating a square wave having a transition at the beginning of each second interruption and means for delaying one transition of said square wave by the time length of an interruption to derive an asymmetrical square wave, said asymmetrical square wave defining the time periods during which the reference signal and test signal are selected as the output signal, the longer portion of the asymmetrical square wave including said delay defining the test signal time period, whereby the test signal time period begins and ends with an interruption and includes an interruption between the beginning and ending interruptions.

46. The combination of claim 45 wherein said divider means includes means responsive to the cessation of said recorded or recovered test signal for resetting said divider means.

47. The combination of claim 29 wherein the wide frequency range signal is a pink noise signal.

48. The recorded medium according to claims 29 or 30 wherein the wide frequency range signal is a pink noise signal.

49. The apparatus of claim 3 wherein the apparatus is for use in calibrating a multi-track audio tape recorder/reproducer, wherein said means for generating a test signal synchronized itself to the timing of the brief interruptions of a previously recorded test signal played back by a record head functioning as a playback head in at least one track, thereby generating a synchronized test signal, and said means for applying said test signal to said recording medium applies said synchronized test signal to one or more of the other tracks.

50. The apparatus of claim 4 wherein the apparatus is for use in calibrating a multi-track audio tape recorder/reproducer, wherein said means for generating a test signal synchronizes itself to the timing of the repetitive identifier or brief interruptions of a previously recorded test signal played back by a record head functioning as a playback head in at least one track, thereby generating a synchronized test signal, and said means for applying said test signal to said recording medium applies said synchronized test signal to one or more of the other tracks.

* * * * *

UNITED STATES PATENT AND TRADEMARK OFFICE
CERTIFICATE OF CORRECTION

PATENT NO. : 4,773,094
DATED : September 20, 1988
INVENTOR(S) : RAY MILTON DOLBY Page 1 of 2

It is certified that error appears in the above-identified patent and that said Letters Patent is hereby corrected as shown below:

```
Column 7:
   Line 3:    add --is-- before"preferred"
Column 9:
   Line 28:   "with" should be --which--
Column 12:
   Line 65:   add --)-- after "114"
   Line 66:   delete ")"
Column 13:
   Line 52:   "comiong" should be --coming--
   Line 66:   "ther" should be --the--
Column 14:
   Line 10:   "174" should be --175--
   Line 48:   "teh" should be --the--
   Line 64:   "reeference" should be --reference--
Column 16:
   Line 25:   "auto" should be --Auto--
Column 18:
   Line 2:    "offtape" should be --off-tape--
Column 20:
   Line 5:    delete "-" after "/"
Column 25:
   Line 2:    delete "-" after "/"
   Line 5:    "synchronized" should be --synchronizes--
Column 26:
   Line 2:    delete "-" after "/"
```

UNITED STATES PATENT AND TRADEMARK OFFICE
CERTIFICATE OF CORRECTION

PATENT NO. : 4,773,094

DATED : September 20, 1988

INVENTOR(S) : Ray Milton Dolby

Page 2 of 2

It is certified that error appears in the above-identified patent and that said Letters Patent is hereby corrected as shown below:

Column 26:
　Line 2: delete "-" after "/"

Signed and Sealed this

Seventh Day of November, 1989

Attest:

JEFFREY M. SAMUELS

Attesting Officer    Acting Commissioner of Patents and Trademarks